E. V. HARTFORD.
ANTIVIBRATION DEVICE FOR VEHICLES.
APPLICATION FILED FEB. 7, 1906.
1,189,943.
Patented July 4, 1916.
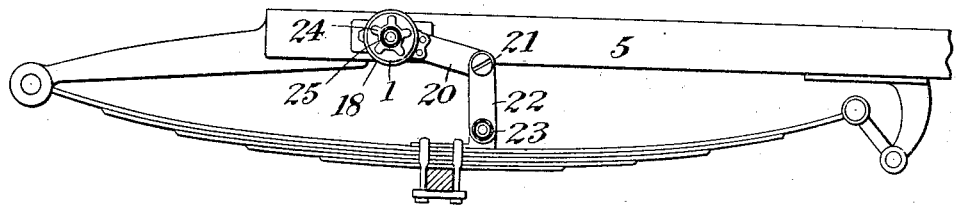
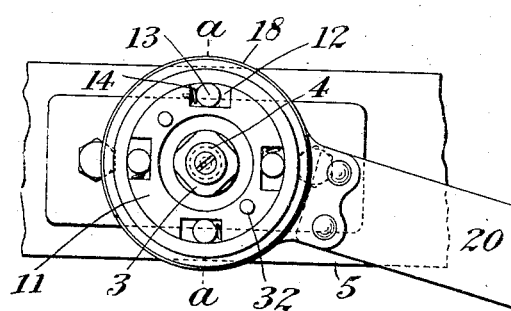
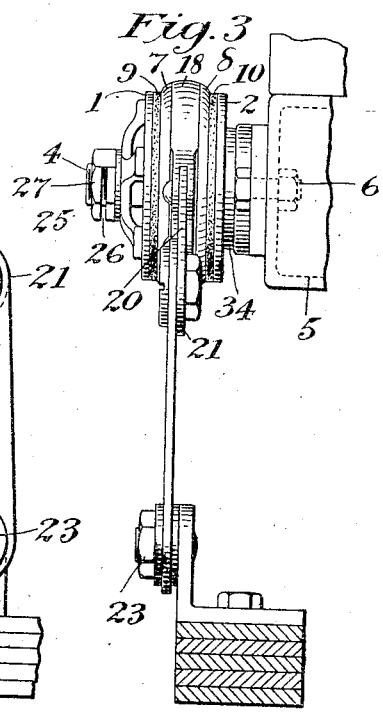
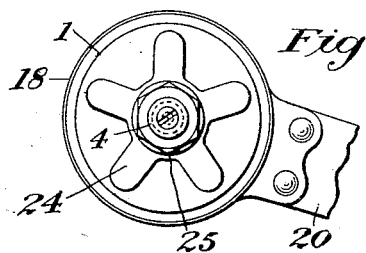
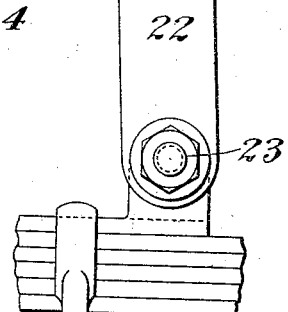
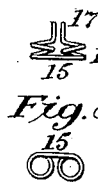
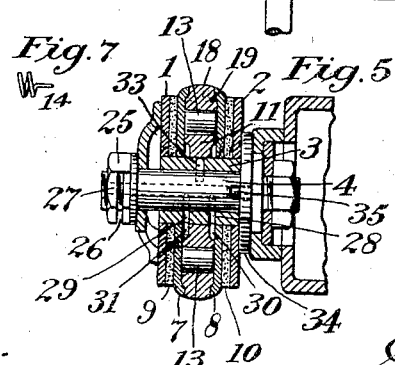
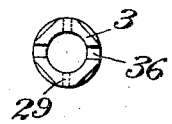
Witnesses
Chas. D. King
A. C. Fischer
Inventor:
Edward V. Hartford
by
Dunn & Fink
Attys.

UNITED STATES PATENT OFFICE.

EDWARD V. HARTFORD, OF NEW YORK, N. Y.

ANTIVIBRATION DEVICE FOR VEHICLES.

1,189,943.

Specification of Letters Patent.

Patented July 4, 1916.

Application filed February 7, 1906. Serial No. 299,867.

*To all whom it may concern:*

Be it known that I, EDWARD V. HARTFORD, a citizen of the United States, residing in the city, county, and State of New York, have invented certain new and useful Improvements in Antivibration Devices for Vehicles, of which the following is a full, clear, and exact specification.

This invention relates to anti-vibration devices for vehicles, and it consists in the novel combination of parts hereinafter more fully described. Devices of such character have usually been situated at the intersection of pivoted operating arms which were attached to the suspended portion and the running gear, respectively, of the vehicle. It occasionally is desirable to attach the friction device directly to the body portion of the vehicle and to connect the same by suitable pivotal connections to the running gear. My invention is designed to produce a device particularly adapted to be used in such manner, although it may also be used by being attached to the junction of the said operating arms.

In the drawing Figure 1 is a side elevation of portions of the body and running gear of the vehicle, showing my device attached thereto. Fig. 2 is a side elevation of the said device with some of the parts removed. Fig. 3 is an end view of the device; Fig. 4 a detailed side view thereof; Fig. 5 a cross-section thereof taken on the line $a$—$a$ of Fig. 2. Figs. 6, 7 and 8 are details of the frictional spring and Fig. 9 is a detail of the central hub or bushing.

Upon the exterior of the device are situated two substantially circular parallel friction disks 1 and 2. These are formed with rectangular central openings, which fit over squared ends of a connecting hub or bushing 3, upon which the disks are carried, and which permits a lateral movement thereof, for purposes of adjustment but holds the disks against rotation. Bushing 3 is made hollow for the reception of a supporting spindle or bolt 4, which has fixed upon it flange 34, carrying forwardly projecting studs 35. The bushing 3 is attached to bolt 4 by means of rivet 33 which passes through bushing 3 and enters bolt 4 and by studs 35 which enter slots 36 in the bushing and take the torsional strain, which prevents longitudinal movement of the bushing on the bolt. By means of bolt 4, the device is rigidly attached to the side bar 5 of the vehicle for which purpose any convenient means, such as nut 6, shown in dotted lines in Fig. 3, may be employed.

Situated between the friction disks 1 and 2 are parallel rotating friction disks 7 and 8 and between disks 1 and 7, and disks 2 and 8 are placed sheets 9 and 10 of friction material. This friction material may be either leather, vulcanized fiber or other suitable material. Rotating friction disks 7 and 8 are rigidly secured to each other by an annular ring 11, by means of rivets 32 and the said rotating friction disks and annular ring revolve freely upon the hub or bushing 3. Annular ring 11 has upon its periphery a series of recesses 12, which are designed to receive friction rollers 13 which are subject to pressure from springs 14 shown in detail in Figs. 6, 7 and 8. Springs 14 are each constructed of an integral piece of tempered wire formed into a central straight portion 15 which bears against the side of the roller 13 and which is connected to oppositely wound helical springs 16 terminating in straight projecting parts 17 which are bent substantially at right angles to the straight portion 15 and enter holes in the walls or recesses 12 and anchor the said springs 14 in place.

Fitting snugly upon the recessed ring 11 is a locking ring 18 which encircles the entire periphery of the recessed ring 11 and as shown is contained within the inner friction rings 7 and 8, having shoulders 19 which receive the inwardly extending outer edges of the said friction rings 7 and 8. Attached to the locking ring 18 is an arm 20 pivoted at 21 to an arm 22 which at 23 is pivoted to the running gear of the vehicle. The recesses 12 are deeper at one part than at another and are so constructed that when the arms 22 move upward, locking ring 18 will rotate freely upon recessed ring 11, but when the said locking ring moves in the opposite direction the rollers 13, will under the impulse of springs 14, be forced toward the shallower part of recesses 12 and will cause the locking ring 18 to be locked to recessed ring 11 and inner friction disks 7, and 8, and will cause the frictional parts to operate.

A spring spider 24 is situated at the outside of friction disk 1 and is for the purpose of maintaining the pressure between friction disks 1 and 7 and 2 and 8, and compensating for wear on the engaging faces thereof, and on friction material 9, 10. For this purpose the outer end of spindle or bolt 4 is threaded and receives a nut 25, by which the spring spider may be adjusted and held in place. This nut has a slit 26 formed in its side and before application the slitted side of the nut is compressed, partially closing the slit, and by means of this nut will be pinched or locked when applied to the bolt or spindle 4. An axial channel 27 is formed in said bolt 4, which communicates with ports 28 and 29 in the hub or bushing 3, leading to reservoirs 30, 31, in the recessed ring 11, by means of which the parts may be lubricated. Channels 27 may be closed by a small screw.

The reservoirs for lubricating material are located adjacent the friction plates and in such position that the lubricating material will be kept fluidic by the heat generated by the friction of said plates, which are almost constantly in motion. This location prevents the congealing of said lubricant in cold weather, which would otherwise be apt to occur.

It will be seen that the lubricant reservoir is located in position to supply the ratchet mechanism and also the friction disks. The ports or orifices leading from the lubricant reservoir will carry the lubricant to the friction rollers and to the friction surfaces of the disks.

If desired my improved device may be used without the friction rollers, in which case the said rollers may be omitted as well as the recessed ring 11 and the outer ring 18 may be attached directly to the friction disks 7 and 8.

It is obvious that many modifications and changes may be made from the exact constructions shown and described without departing from the spirit of my invention, and I do not intend to limit myself to the specific form shown, but

What I claim and desire to secure by Letters Patent is:

1. An anti-vibration device for vehicles, comprising oppositely-disposed friction disks, friction material between said disks, a recessed annulus rigidly secured to one of said disks, friction rollers in said recesses, springs in said recesses bearing upon said rollers formed of a single piece of tempered wire having a straight portion connecting double, oppositely-wound, helical springs terminating in straight, parallel portions substantially at right angles to said straight portions, a locking ring surrounding said recessed annulus, and connections between said locking ring and one of said friction disks to the suspended portion and running gear respectively of a vehicle, whereby said locking ring will move freely in one direction and will cause said friction disks to operate if moved in the other direction, substantially as described.

2. A spring for anti-vibration devices for vehicles formed of a single piece of wire having a straight portion connecting double, oppositely-wound, helical portions terminating in straight parts at substantially right angles to said straight connection portion, substantially as described.

In testimony whereof I subscribe my name before two witnesses.

EDWARD V. HARTFORD.

Witnesses:
G. F. HARTFORD,
ADOLPH F. DINSE.